(12) United States Patent
Pang

(10) Patent No.: US 9,591,616 B2
(45) Date of Patent: Mar. 7, 2017

(54) DATA TRANSMISSION

(71) Applicant: Alibaba Group Holding Limited, Grand Cayman (KY)

(72) Inventor: Lei Pang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 66 days.

(21) Appl. No.: 14/692,536

(22) Filed: Apr. 21, 2015

(65) Prior Publication Data

US 2015/0312885 A1   Oct. 29, 2015

(30) Foreign Application Priority Data

Apr. 25, 2014   (CN) .......................... 2014 1 0171551

(51) Int. Cl.
| | | |
|---|---|---|
| *H04W 72/00* | (2009.01) | |
| *H04W 4/00* | (2009.01) | |
| *H04W 4/06* | (2009.01) | |
| *H04W 52/02* | (2009.01) | |
| *H04W 84/10* | (2009.01) | |
| *H04W 84/18* | (2009.01) | |

(52) U.S. Cl.
CPC ......... *H04W 72/005* (2013.01); *H04W 4/008* (2013.01); *H04W 4/06* (2013.01); *H04W 52/0219* (2013.01); *H04W 84/10* (2013.01); *H04W 84/18* (2013.01); *Y02B 60/50* (2013.01)

(58) Field of Classification Search
CPC ........... H04W 72/005; H04W 52/0219; H04W 4/008; H04W 4/06; H04W 84/10; H04W 84/18; Y02B 60/50; G06F 17/3089; H04L 67/02

See application file for complete search history.

(56) References Cited

U.S. PATENT DOCUMENTS

| | | |
|---|---|---|
| 5,117,351 A | 5/1992 | Miller |
| 2002/0016913 A1 | 2/2002 | Wheeler et al. |
| 2008/0008201 A1 | 1/2008 | Imahase et al. |
| 2008/0090524 A1 | 4/2008 | Lee et al. |
| 2008/0183757 A1* | 7/2008 | Dorogusker ....... G06Q 30/0241 |
| 2010/0042297 A1 | 2/2010 | Foster et al. |
| 2010/0257251 A1 | 10/2010 | Mooring et al. |

(Continued)

OTHER PUBLICATIONS

PCT Search Report and Written Opinion mailed Jul. 28, 2015 for PCT Application No. PCT/US15/26924, 8 Pages.

*Primary Examiner* — Paul H Masur
*Assistant Examiner* — Kabir Jahangir
(74) *Attorney, Agent, or Firm* — Lee & Hayes, PLLC

(57) ABSTRACT

Methods, apparatuses, and systems for data transmission are described. A sending terminal sends data and a data identification of the data to a server. The data identification is broadcasted to one or more receiving terminals through a short distance wireless communication. The receiving terminal obtains the data from the server according to the data identification. When the sending terminal needs to transmit data to multiple receiving terminals, the techniques of the present disclosure do not require the sending terminal to establish a point-to-point connection with each of the receiving terminal. Thus, the techniques of the present disclosure effectively reduce transmission time with multiple receiving terminals, improve data transmission efficiency, and lower power consumption at the sending terminal.

20 Claims, 9 Drawing Sheets

(56) References Cited

U.S. PATENT DOCUMENTS

| | | |
|---|---|---|
| 2012/0110568 A1 | 5/2012 | Abel et al. |
| 2012/0171958 A1 | 7/2012 | Cornett et al. |
| 2012/0233646 A1* | 9/2012 | Coniglio ........ H04N 21/234327 725/78 |
| 2012/0311176 A1* | 12/2012 | Dellinger .......... H04M 15/8055 709/232 |
| 2013/0054697 A1* | 2/2013 | Cha .................... H04N 21/2347 709/204 |

* cited by examiner

DATA TRANSMISSION

CROSS-REFERENCE TO RELATED PATENT APPLICATIONS

This application claims foreign priority to Chinese Patent Application No. 201410171551.4 filed on Apr. 25, 2014 entitled "Data Transmission Method, Apparatus, and System," which is hereby incorporated by reference in its entirety.

TECHNICAL FIELD

The present disclosure generally relates to the field of computer technology, and, more particularly, to a data transmission method, apparatus, and system.

BACKGROUND

With the development of communication technology, short distance wireless communication technology has been widely used in our daily lives and work for conducting wireless information transmission between mobile phones, personal digital assistants (PDAs), wireless earphones, laptops, etc. Bluetooth is a typical short distance wireless communication technology.

Under the existing techniques, a data transmission method via Bluetooth is as follows. A sending terminal and a receiving terminal establish a point-to-point connection via Bluetooth and then conduct data transmission through the point-to-point connection.

The existing techniques have the following shortcomings. When the sending terminal and the receiving terminal establish the point-to-point connection, the sending terminal can only establish the point-to-point connection with one receiving terminal. Thus, one sending terminal can only transmit data to one receiving terminal at a particular time. When the sending terminal needs to transmit data to multiple receiving terminals, the sending terminal has to establish a connection with each receiving terminal via Bluetooth in turn.

For example, the sending terminal needs to send a string X to receiving terminals 1, 2, and 3. The detailed operations may be as follows. At first, the sending terminal establishes a point-to-point connection with the receiving terminal 1 via Bluetooth. Based on the point-to-point connection, the sending terminal sends the string X to the receiving terminal 1. After transmitting with the receiving terminal 1 is completed, the sending terminal disconnects the point-to-point connection with the receiving terminal 1. Then, the sending terminal establishes a point-to-point connection with the receiving terminal 2 via Bluetooth. Based on the point-to-point connection, the sending terminal sends the string X to the receiving terminal 2. After transmitting with the receiving terminal 2 is completed, the sending terminal disconnects the point-to-point connection with the receiving terminal 2. Finally, the sending terminal establishes a point-to-point connection with the receiving terminal 3 via Bluetooth. Based on the point-to-point connection, the sending terminal sends the string X to the receiving terminal 3.

As shown above, when the sending terminal needs to transmit data to multiple receiving terminals, the sending terminal needs to establish a connection with each receiving terminal via Bluetooth and transmit data with each receiving terminal one by one, thereby causing low data transmission efficiency and high power consumption at the sending terminal.

Therefore, new data transmission techniques are required to solve the low data transmission efficiency and high power consumption at the sending terminal caused by the existing technique that the sending terminal may only transmit data with one receiving terminal at the same time.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides data transmission techniques that resolve the technical problem that one sending terminal only transmits data with one receiving terminal at the same time under the existing techniques. The technical problem causes low data transmission efficiency and high power consumption at a sending terminal.

An embodiment of the present disclosure provides an example data transmission method. Data and a data identification of the data are uploaded to a server. The data identification is broadcasted to one or more receiving terminals through a short distance wireless communication including a short distance communication protocol.

Another embodiment of the present disclosure provides another example data transmission method. A data identification broadcasted by a sending terminal is received through a short distance wireless communication including a short distance communication protocol. The data identification is sent to a server. Data corresponding to the data identification returned by the server is received.

Another embodiment of the present disclosure provides another example data transmission method. Data and a data identification of the data uploaded by a sending terminal are received. The data identification sent by a receiving terminal is received. A sending terminal broadcasts the data identification to one or more receiving terminals through a short distance wireless communication including a short distance communication protocol. The sending terminal also sends the data corresponding to the data identification to the receiving terminal.

Another embodiment of the present disclosure provides an example data transmission system that includes a sending terminal, one or more receiving terminals, and a server. The sending terminal uploads data and a data identification of the data to a server and broadcasts the data identification to one or more receiving terminals through a short distance wireless communication including a short distance communication protocol. A respective receiving terminal receives the data identification broadcasted by the sending terminal, sends the data identification to the server, and receives the data corresponding to the data identification returned by the server. The server receives the data and the corresponding data identification uploaded by the sending terminal, receives the data identification sent by the respective receiving terminal, and sends the data corresponding to the data identification to the respective receiving terminal.

Another embodiment of the present disclosure provides an example data transmission apparatus including an uploading module and a broadcasting module. The uploading module transmits data and a data identification of the data to a server. The broadcasting module broadcasts the data identification to one or more receiving terminals through a short distance wireless communication including a short distance communication protocol.

Another embodiment of the present disclosure provides another example data transmission apparatus including a first receiving module, a sending module, and a second receiving module. The first receiving module receives a data identification broadcasted by a sending terminal through a short distance wireless communication including a short distance communication protocol. The sending module sends the data identification to the server. The second receiving module receives data corresponding to the data identification returned by the server.

Another embodiment of the present disclosure provides another example data transmission apparatus including a first receiving module, a second receiving module, and a sending module. The first receiving module receives data and a data identification of the data uploaded by a sending terminal. The second receiving module receives the data identification sent by a receiving terminal. The sending terminal broadcasts the data identification to one or more receiving terminals through a short distance wireless communication including a short distance communication protocol. The sending module sends the data corresponding to the data identification to the receiving terminal.

Under the present techniques, a sending terminal sends data and a data identification corresponding to the data to a server and broadcasts the data identification to one or more receiving terminals through a short distance wireless communication including a short distance communication protocol. After receiving the data identification broadcasted by the sending terminal through the short distance wireless communication, a receiving terminal obtains the data corresponding to the data identification from the server according to the data identification. According to the present techniques, when the sending terminal transmits the data to multiple receiving terminals, it is not necessary for the sending terminal to establish a point-to-point connection with each receiving terminal and transmit data one by one. Thus, the techniques of the present disclosure effectively reduce data transmission time to the multiple receiving terminals, improve data transmission efficiency, and reduce power consumption at the sending terminal.

BRIEF DESCRIPTION OF THE DRAWINGS

The accompanying FIGs illustrate the present disclosure and become part of the present disclosure. The example embodiments of the present disclosure and their descriptions are used to illustrate the present disclosure, and shall not be construed to unduly limit the present disclosure.

DETAILED DESCRIPTION

Under the present techniques, a sending terminal sends data and a data identification corresponding to the data to a server and broadcasts the data identification to one or more receiving terminals through a short distance wireless communication including a short distance communication protocol. After receiving the data identification broadcasted by the sending terminal through the short distance wireless communication, a receiving terminal obtains the data corresponding to the data identification from the server according to the data identification. According to the present techniques, when the sending terminal transmits the data to multiple receiving terminals, it is not necessary for the sending terminal to establish a point-to-point connection with each receiving terminal and transmit data one by one. Thus, the techniques of the present disclosure improve data transmission efficiency and reduce power consumption at the sending terminal.

To clearly illustrate the purpose, technical solutions, and technical advantage of the present disclosure, the techniques of the present disclosure are described by the example embodiments of the present disclosure and their corresponding FIGS. The described example embodiments herein are only a portion of the embodiments of the present disclosure, and are not all of the embodiments of the present disclosure. The other embodiments obtained by one of ordinary skill in the art without using creative efforts fall under the protection of the present disclosure.

Figure 1:
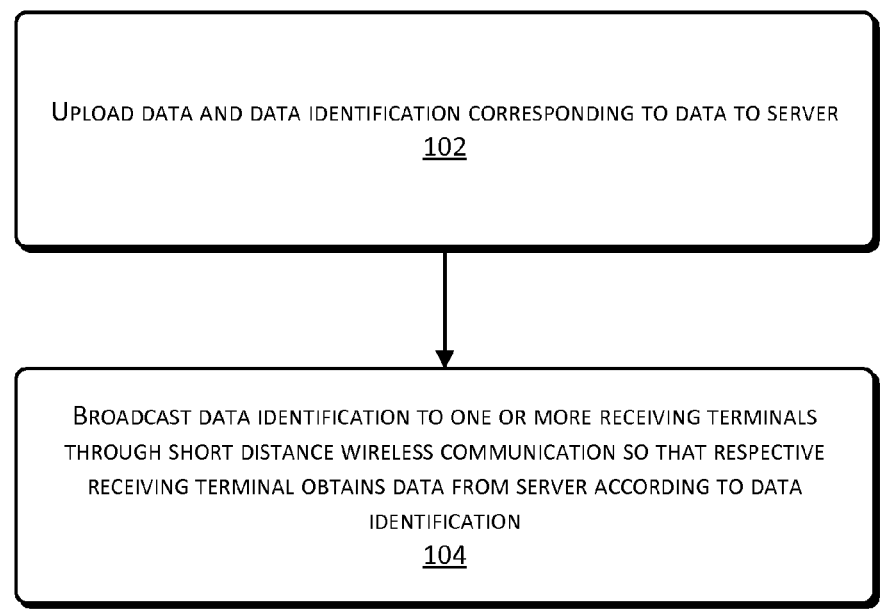
FIG. 1 is a flow chart illustrating an example data transmission method of a sending terminal according to an example embodiment of the present disclosure.

FIG. 1 is a flow chart illustrating an example data transmission method of a sending terminal according to an example embodiment of the present disclosure.

At 102, data and a data identification corresponding to the data are uploaded to a server.

For example, the sending terminal may use a wired transmission method such as a cable or a data line to transmit the data to be sent to a receiving terminal and the data identification corresponding to the data to the server. Alternatively, the sending terminal may use a wireless communication method such as WiFi to transmit the data to be sent to a receiving terminal and the data identification corresponding to the data to the server. The data identification identifies the data uploaded from the sending terminal to the server.

For example, a sending terminal A needs to send a picture aaa to a receiving terminal 1, a receiving terminal 2, and a receiving terminal 3. The sending terminal A may firstly generate a data identification xyz corresponding to the picture aaa and sends the picture aaa and the data identification xyz corresponding to the picture aaa to a server C through WiFi.

At 104, the data identification is broadcasted to one or more receiving terminals through a short distance wireless communication including a short distance communication protocol so that a respective receiving terminal obtains the data from the server according to the data identification.

For example, the short distance wireless communication may include, but is not limited to, Bluetooth communication, Infrared communication, Zigbee communication and their corresponding protocols. A number of the receiving terminals is at least one.

For example, at 104, when the sending terminal broadcasts the data identification to one or more receiving terminals through the short distance wireless communication, all of the receiving terminals receive the data identification broadcasted by the sending terminal within a broadcast coverage range of the short distance wireless communication. At 102, the sending terminal transmits the data and its corresponding data identification to the server for one time. A receiving terminal that receives the data identification broadcasted by the sending terminal receives the data from the server. Thus, the techniques of the present disclosure achieve the purpose that one sending terminal sends the data to multiple receiving terminals at the same time.

Following the previous example, the sending terminal A may broadcast the data identification xyz to the receiving terminal 1, the receiving terminal 2, and the receiving terminal 3 through Bluetooth broadcast. The data identification xyz corresponding to the picture aaa. Then, the receiving terminal 1, the receiving terminal 2, and the receiving terminal 3 send the data identification xyz to the server. The server C searches for the corresponding picture aaa according to the data identification syz and sends the picture aaa to the receiving terminal 1, the receiving terminal 2, and the receiving terminal 3.

As shown above, the sending terminal A uploads the picture aaa and its corresponding data identification xyz to the server C for one time and broadcasts the data identification xyz to the receiving terminal 1, the receiving terminal 2, and the receiving terminal 3 through Bluetooth broadcast. After receiving the data identification xyz broadcasted by the sending terminal, the receiving terminal 1, the receiving terminal 2, and the receiving terminal 3 obtain the picture aaa corresponding to the data identification xyz from the server. Thus, the techniques of the present disclosure achieve the purpose that one sending terminal sends the data to multiple receiving terminals at the same time. Compared with existing techniques, it is not necessary for the sending terminal A to establish a communication with each of the receiving terminal 1, the receiving terminal 2, and the receiving terminal 3 and transmit the picture aaa one receiving terminal by another receiving terminal. The techniques of the present disclosure effectively reduce data transmission time to the multiple receiving terminals, improve data transmission efficiency, and reduce power consumption at the sending terminal.

In addition, under existing techniques, when the sending terminal A transmits the data to the receiving terminal 1, the receiving terminal 2, and the receiving terminal 3, the search terminal firstly needs to search Bluetooth connection signals broadcasted by the receiving terminal 1, the receiving terminal 2, and the receiving terminal 3, and establishes a Bluetooth communication with each of the receiving terminals one by one based on the found Bluetooth connection signals. Thus, efficiency that the sending terminal A sends the picture aaa to each of the receiving terminals is low. Furthermore, as the sending terminal A also needs to broadcast its Bluetooth connection signal so that the receiving terminal 1, the receiving terminal 2, and the receiving terminal 3 establish Bluetooth connections with the sending terminal A according to the Bluetooth connection signal broadcasted by the sending terminal A. Thus, when an irrelevant device requests to establish a Bluetooth connection with the sending terminal A, it causes inconvenience or hassle to a user of the sending terminal A.

In contrast, under the techniques of the present disclosure, when the sending terminal A needs to transmit data with the receiving terminal 1, the receiving terminal 2, and the receiving terminal 3, it is not necessary for the sending terminal A to search for the Bluetooth connection signals of the receiving terminal 1, the receiving terminal 2, and the receiving terminal 3. Thus, efficiency of transmitting the picture aaa is improved. Furthermore, it is not necessary for the sending terminal A to broadcast its Bluetooth connection signals. The techniques of the present disclosure prevent an irrelevant device from establishing the Bluetooth connection with the sending terminal A, thereby avoiding the inconvenience or hassle to the user of the sending terminal A.

For example, the data identification may be a character string including multiple fields. Each field is generated according to a preset rule. For instance, the generated data identification is a character string with 16 bytes and includes three fields. A first field includes a first byte. A second field includes a second byte and a third byte. A third field includes fourth to sixteenth bytes. Each field may be generated according to a rule as shown in Table 1 below.

TABLE 1

| First Byte | Second-Third Bytes | Fourth-Sixteenth Bytes |
| --- | --- | --- |
| Short distance communication method identification | Random number within a preset numerical range | Time length from a previous particular time to current time calculated based on a preset time unit |

In Table 1, assuming that short distance communication methods include Bluetooth communication, Infrared communication, Zigbee communication and their corresponding protocols. A short distance communication method identification for Bluetooth is set as 1, a short distance communication method identification for Infrared is set as 2, and a short distance communication method identification for Zigbee is set as 3. If Bluetooth is used as the short distance communication method, the first byte is 1. Assuming that a preset numerical range is between 10 and 99, the second and the third bytes include a random number between 10 and 99. Assuming that the previous particular time is Jan. 1, 1970 and the preset time unit is millisecond, the fourth byte to the sixteen byte are a number of milliseconds from Jan. 1, 1970 to current time when the data identification is generated.

In a practical implementation, if there are multiple sending terminals, there is a possibility that some sending terminals generate the data identification at the same time. As the third field as shown in Table 1 is a time length from a previous particular time to current time calculated based on a preset time unit, if different data identifications corresponding to different data are generated at the same time, third fields of these data identifications are the same. If the same short distance communication method is accepted for generating two data identifiers and the random numbers in the second fields of the two data identifiers happen to the same, the generated data identifications would be the same too. Thus, based on the data identification as shown in Table 1, it is possible that different data may correspond to the same data identification. When different data corresponding to the same data identification are uploaded to the server, these data would overwrite each other and thus the receiving terminal may not accurately obtain the corresponding data according to the data identification.

For example, a sending terminal A generates a data identification A2 corresponding to data A1 at time t. A sending terminal B generates a data identification B2 corresponding to data B1 at the same time t. As the third field as shown in Table 1 is a time length from a previous particular time to current time calculated based on a preset time unit, the data identification A2 and the data identification B2 have the same third field. As the sending terminal A and the sending terminal B use the same short distance communication method, they have the same first field. If the random number of the second fields of the data identification A2 and the data identification B2 are the same, the data identification A2 is the same as the data identification B2. Accordingly, after receiving the data A1 and its corresponding data identification A2 uploaded by the sending terminal A and the data B1 and its corresponding data identification B2 uploaded by the sending terminal B, the server uses the data A1 to overwrite the data B1 or uses the data B1 to overwrite the data B1.

Generally, later received data is used to overwrite previously received data. For example, the server firstly receives the data A1 and its corresponding data identification A2 uploaded by the sending terminal A and late receives the data B1 and its corresponding data identification B2 uploaded by the sending terminal B. As A2 and B2 are the same, the server uses the data B1 to overwrite the data A1. When the server sends data corresponding to the data identification A2 to the receiving terminal, the server sends the data B1 instead of A1 to the receiving terminal. That is, the data A1 is lost.

To avoid the above problem and ensure reliable data transmission, for example, the data identification, in addition to the three fields as shown in Table 1, may also include a unique device identification of the sending terminal such as an Internet Protocol (IP) address, a media access control (MAC) address, a device number (e.g. International Mobile Station Equipment Identity or IMEI), etc. When the first three bytes of the data identification send by the sending terminals are the same, the unique device identification causes each data identification unique. Therefore, when the receiving terminal obtains corresponding data from the server according to the data identification, the receiving terminal receives the correct data, thereby ensuring reliable data transmission.

For example, a corresponding relationship between the data and the data identification may be established by the sending terminal. For instance, when the sending terminal needs to send the data to the receiving terminal, the sending terminal firstly generates the data identification, establishes the corresponding relationship between the data and the data identification through a relationship mapping table, and then sends the data, the data identification, and the relationship mapping table to the server.

For another example, a corresponding relationship between the data and the data identification may be established by the server. For instance, when the sending terminal needs to send the data to the receiving terminal, the sending terminal firstly generates the data identification, encapsulates the data and the data identification into a data packet, and uploads the data packet to the server. After receiving the data packet, the server establishes the corresponding relationship between the data and data identification in the data packet.

For example, at 104, when the sending terminal broadcasts the data identification to one or more receiving terminals through the short distance wireless communication, the sending terminal broadcasts the data identification to the one or more receiving terminals according to a preset frequency within a preset time period. For instance, the broadcast may be once per 2 seconds in 10 seconds. That is, the sending terminal broadcasts 5 times in 10 seconds. Thus, the techniques of the present disclosure avoid continuous broadcasting in a long time, save power consumption at the sending terminal and the receiving terminal, and facilitate the specific receiving terminal to receive the data identification broadcasted by the sending terminal.

Figure 2:
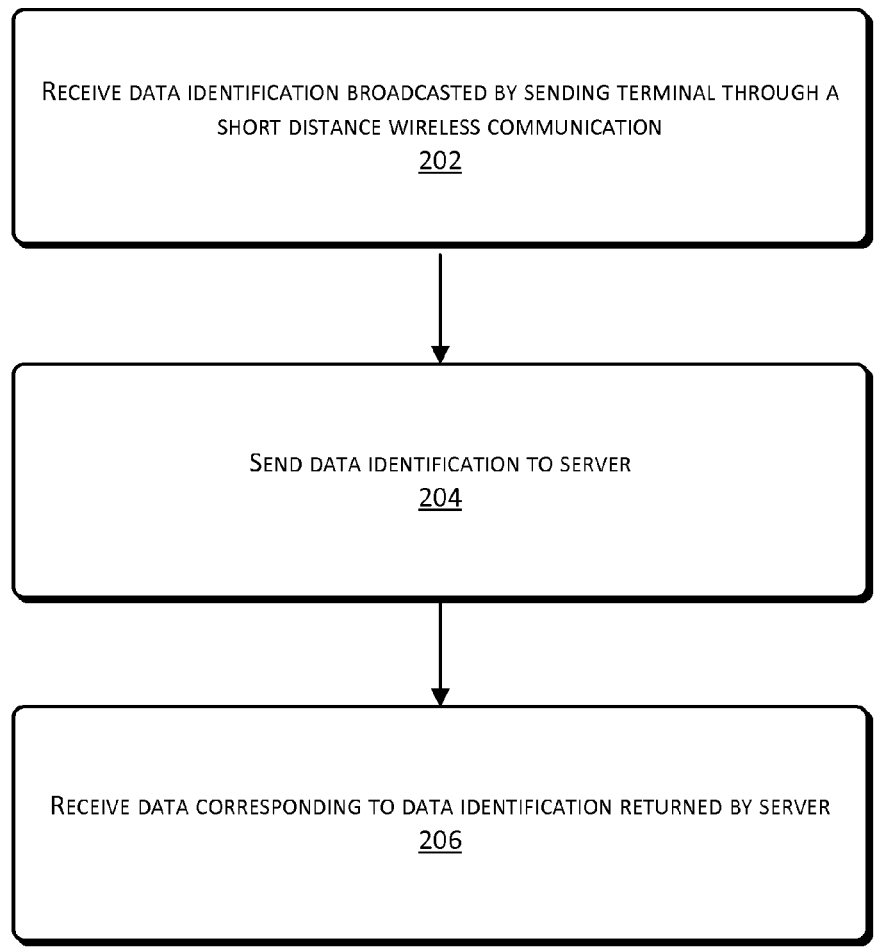
FIG. 2 is a flow chart illustrating an example data transmission method of a receiving terminal according to an example embodiment of the present disclosure.

Based on the process that the sending terminal uploads the data to the server and broadcasts the data identification to one or more receiving terminals as shown in FIG. 1, correspondingly, a process that a receiving terminal receives the data uploaded by the sending terminal to the server is shown in FIG. 2.

FIG. 2 is a flow chart illustrating an example data transmission method of a receiving terminal according to an example embodiment of the present disclosure.

At 202, a data identification broadcasted by a sending terminal is received through a short distance wireless communication including a corresponding short distance wireless communication protocol.

For example, the receiving terminal does not establish a point-to-point connection with the sending terminal. Instead, the receiving terminal receives the data identification broadcasted by the sending terminal through the short distance wireless communication. For example, a number of the receiving terminals may be at least one.

For example, the short distance wireless communication may include, but is not limited to, Bluetooth communication, Infrared communication, Zigbee communication and their corresponding protocols.

For example, when the sending terminal A needs to send the picture aaa to the receiving terminal 1, the receiving terminal 2, and the receiving terminal 3, the sending A broadcasts the data identification xyz to the receiving terminal 1, the receiving terminal 2, and the receiving terminal 3 through Bluetooth broadcast.

The data identification may be a character string including multiple fields. Details of the data identification may refer to corresponding description at 102 in FIG. 1, and thus are not detailed herein.

At 204, the data identification is sent to a server.

After the receiving terminal receives the data identification broadcasted by the sending terminal through short distance wireless communication, the sending terminal may automatically send the data to the server to obtain the data corresponding to the data identification. Alternatively, after receiving an instruction from a user to send the data identification to the server, the receiving terminal sends the data identification to the server to obtain the data corresponding to the data identification.

Following the previous example, after the receiving terminal 1, the receiving terminal 2, and the receiving terminal 3 receive the data identification sent by the sending terminal A through Bluetooth broadcast, they may automatically send the data identification xyz to the server C. Alternatively, after receiving the data identification xyz sent by the sending terminal A through Bluetooth broadcast, the receiving terminal 1, the receiving terminal 2, and the receiving terminal 3 may prompt a message at their corresponding user interface to request the user whether to send the data identification xyz to the server C. After receiving an instruction from the user to send the data identification xyz to the server C, the receiving terminal 2, and the receiving terminal 3 send the data identification xyz to the server C to obtain the data corresponding to the data identification.

At 206, data corresponding to the data identification returned by the server is received.

For example, after the receiving terminal sends the received data identification to the server, the server searches for the data corresponding to the data identification according to a corresponding relationship between the data and the data identification and sends the found data corresponding to the data identification to the receiving terminal.

Following the previous example, after receiving the data identification xyz sent by the receiving terminal 1, the receiving terminal 2, and the receiving terminal 3, the server C searches for the picture aaa according to the corresponding relationship between the data identification xyz and the picture aaa and returns the found picture aaa to the receiving terminal 1, the receiving terminal 2, and the receiving terminal 3.

Figure 3:
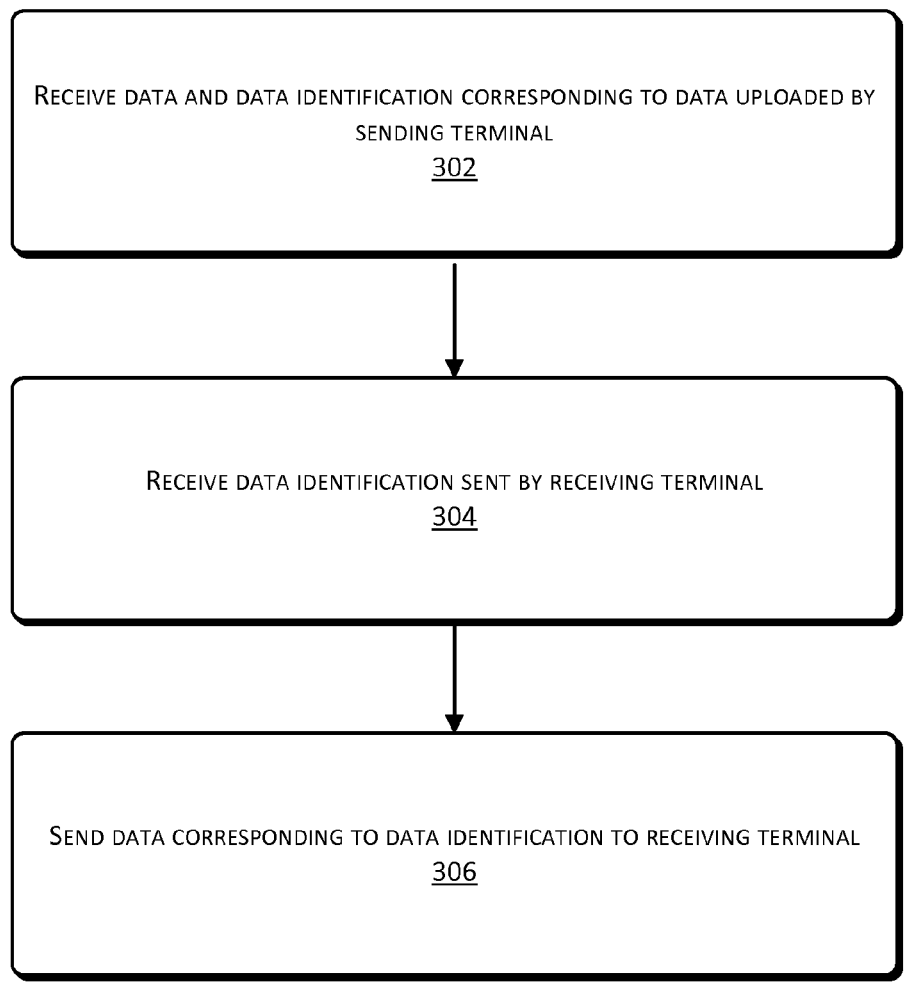
FIG. 3 is a flow chart illustrating an example data transmission method of a server according to an example embodiment of the present disclosure.

FIG. 3 is a flow chart illustrating an example data transmission method of a server according to an example embodiment of the present disclosure.

At 302, data and a data identification corresponding to the data uploaded by a sending terminal are received.

For example, the server may receive the data and its corresponding data identification uploaded by the sending terminal through wired communications such as cable or data line or wireless communications such as WiFi. The data identification identifies the data uploaded from the sending terminal to the server.

For example, when the sending terminal A needs to send the picture aaa to the receiving terminal 1, the receiving terminal 2, and the receiving terminal 3, the server C may receive the picture aaa and its corresponding data identification xyz uploaded by the sending terminal A through WiFi.

The data identification may be a character string including multiple fields. Details of the data identification may refer to corresponding description at 102 in FIG. 1, and thus are not detailed herein.

At 304, the data identification sent by a receiving terminal is received.

The data identification is received by the receiving terminal from the sending terminal through short distance wireless communication. A number of the receiving terminals may be at least one.

Following the previous example, the server C receives the data identification xyz sent by the receiving terminal 1, the receiving terminal 2, and the receiving terminal 3 through WiFi. The data identification xyz is sent by the sending terminal A to the receiving terminal 1, the receiving terminal 2, and the receiving terminal 3 through Bluetooth broadcast.

At 306, data corresponding to the data identification is sent to the receiving terminal.

For example, after receiving the data identification, the receiving terminal searches for the data corresponding to the data identification according to a corresponding relationship between the data and the data identification, and returns the data to the receiving terminal.

Following the previous example, after receiving the data identification sent by the receiving terminal 1, the receiving terminal 2, and the receiving terminal 3, the server C searches for the picture aaa according to the corresponding relationship between the data identification xyz and the picture aaa, and sends the found picture aaa to the receiving terminal 1, the receiving terminal 2, and the receiving terminal 3.

In an example implementation, a user may need to know other surrounding users. To satisfy such user requirement, the sending terminal may send a user identification of the sending terminal as data to the server, and broadcasts a data identification corresponding to the user identification of the sending terminal through short distance wireless communication. A receiving terminal obtains the user identification of the sending terminal from the server according to the received data identification so that a user of the receiving terminal is aware of an existence of the user that uses the sending terminal. For example, at 102 in FIG. 1, the operation that the sending terminal uploads the data to the server may further include the following operation. The user identification of the sending terminal is obtained and then uploaded as the data to the server. Correspondingly, at 302 in FIG. 3, the operation that the server receives the data uploaded by the sending terminal may further include the following operation. The user identification of the sending terminal uploaded by the sending terminal is received. Correspondingly, the example method as shown in FIG. 2 may further include the following operation. When the data received by the receiving terminal is the user identification of the sending terminal, user information corresponding to the user identification of the sending terminal is obtained according to the user identification of the sending terminal. For example, the receiving terminal may obtain the corresponding information from the server or a third party device according to the user identification of the sending terminal.

Further, by reference to the example method for obtaining the data corresponding to the data identification by the receiving terminal from the server as shown in FIG. 2, if the data obtained by the receiving terminal from the server is general data such as a picture, no further operation needs to be performed. If the data obtained by the receiving terminal from the server is the user identification of the sending terminal, the corresponding user information is obtained from the server or the third party device according to the user identification of the sending terminal. Thus, the receiving terminal needs to identify whether the obtained data from the server is general data such as pictures or the user identification of the sending terminal.

In order to identify whether the obtained data is the general data or the user identification of the sending terminal, two functions may be preset in the sending terminal. One is general data transmission function and the other is neighboring user finding function. When certain data is uploaded to the server by using the neighboring user finding function, the sending terminal sets a preset label with the data and uploads the data with the preset label to the server. When data is uploaded to the server by using the general data transmission function, the sending terminal does not set a label for the data and directly uploads the data to the server. When the receiving terminal receives the data from the server, the receiving terminal identifies whether the data has the label. If the data is identified with the label, the data is determined as the user identification of the sending terminal and the corresponding user information is obtained from the server or the third party device according to the user identification of the sending terminal. If the data is not identified with the label, the data is determined as general data and no further operation needs to be performed.

Accordingly, when the user of the sending terminal intends to be discovered by a neighboring user, the user of the sending terminal may use the neighboring user finding function at the sending terminal to upload the user identification of the sending terminal to the server. For example, the sending terminal sets a label corresponding to the user identification of the sending terminal and then sends the user identification of the sending terminal that sets the label and the corresponding data identification to the server. After the receiving terminal receives the user identification of the sending terminal from the server, the receiving terminal identifies that the obtained data (i.e., the user identification of the sending terminal) includes the label and thus determines that the data is the user identification of the sending terminal. The receiving terminal further obtains the corresponding user information from the server or the third party device according to the user identification of the sending terminal.

The user identification of the sending terminal may be input by the user into the sending terminal or pre-stored at the sending terminal. The user identification of the sending terminal may include, but is not limited to, a nickname or a user name of the user of the sending terminal.

For example, when the user of the sending terminal A needs to be discovered by the neighboring user, the neighboring user finding function at the sending terminal may be used to upload the user identification of the sending terminal to the server. For instance, the sending terminal A retrieves the user identification of the sending terminal that is pre-stored at the sending terminal, and sets the label for the user identification of the sending terminal. Then the sending terminal A uploads the user identification of the sending terminal with the label to the server C. After receiving corresponding data from the server C, the receiving terminal B identifies that the obtained data (i.e., the user identification of the sending terminal) has the label and thus determines that the data is the user identification of the sending terminal. The receiving terminal B further automatically retrieves the user information corresponding to the user identification of the sending terminal from the server C or a third party device according to the user identification of the sending terminal. Alternatively, the receiving terminal B may wait until receiving an instruction from a user and then retrieve the user information corresponding to the user identification of the sending terminal from the server C or a third party device according to the user identification of the sending terminal. For instance, the retrieved user information may include: John, Male, 30 years old. Through the above described method, the user of the receiving terminal B discovers the user of the receiving terminal A.

Figure 4:
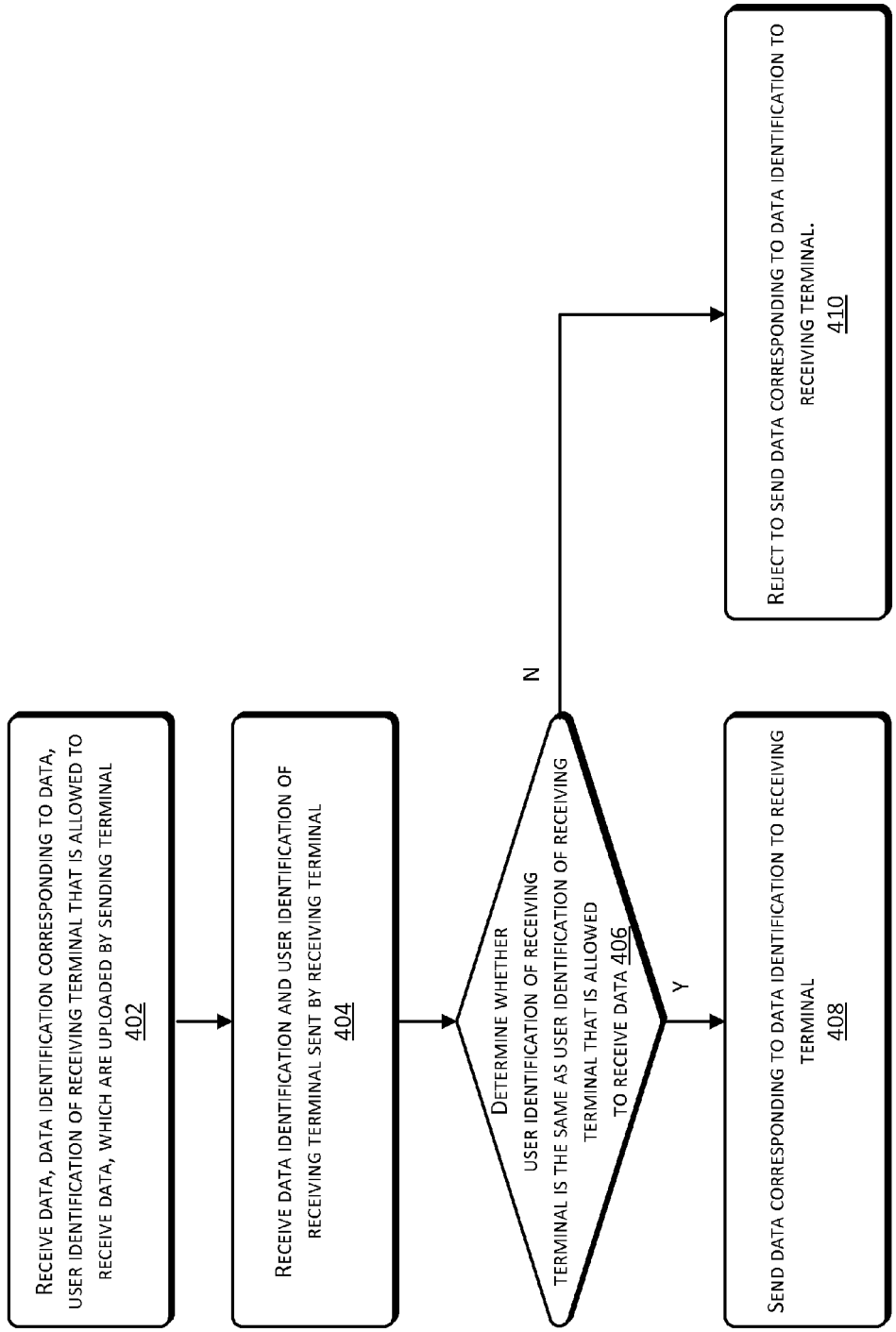
FIG. 4 is a flow chart illustrating an example detailed data transmission method of a server according to an example embodiment of the present disclosure.

Based on the methods described in FIGS. 1-3, the sending terminal uploads the data and the data identification corresponding to the data to the server, and broadcasts the data identification through short distance wireless communication. Within the broadcast coverage range, each receiving terminal receives the data identification. The receiving terminal that receives the data identification obtains the corresponding data from the server according to the data identification. Thus, through the above described methods, the sending terminal may not only send the data to a designated receiving terminal within the broadcast coverage range. The described methods in FIGS. 1-3 may not guarantee privacy of data transmission. To ensure that a receiving terminal that receives the data may be designated and guarantee the privacy of data transmission, the present disclosure also provides another example data transmission method as shown in FIG. 4.

At 402, data, a data identification corresponding to the data, a user identification of a receiving terminal that is allowed to receive the data, which are uploaded by a sending terminal, are received.

To ensure privacy of data transmission, the sending terminal may designate a user identification of a receiving terminal that is allowed to receive the data and send the user identification of the designated receiving terminal to a server.

For example, when the sending terminal A needs to send the picture aaa to the receiving terminal 1, assuming that a user identification of the receiving terminal 1 is bbb, the sending terminal A may designate that the user identification of the receiving terminal that is allowed to receive the picture is bbb. For instance, the sending A firstly generates a data identification xyz corresponding to the picture aaa, and then sends the picture aaa, the data identification xyz corresponding to the picture aaa, and the user identification bbb of the designated receiving terminal that is allowed to received the picture to the server C through WiFi. Correspondingly, in addition to receiving the picture aaa and its corresponding data identification xyz uploaded by the sending terminal A, the server C also receives the user identification bbb of the designated receiving terminal that is allowed to received the picture, which is uploaded by the sending terminal A.

At 404, the data identification and the user identification of the receiving terminal sent by the receiving terminal are received.

The user identification of the receiving terminal may be pre-stored in the receiving terminal or manually input into the receiving terminal by the user of the receiving terminal.

Following the previous example, each of the receiving terminal 1, the receiving terminal 2, and the receiving terminal 3 receives the data identification xyz broadcasted by the sending terminal A. The receiving terminal 1 automatically sends the data identification xyz and the user identification bbb of the receiving terminal 1 to the server C. The receiving terminal 2 automatically sends the data identification xyz and the user identification ccc of the receiving terminal 2 to the server C. The receiving terminal 3 automatically sends the data identification xyz and the user identification ddd of receiving terminal 3 to the server C. Correspondingly, the server C receives the data identification xyz and the user identification of the receiving terminals, i.e., bbb, ccc, and ddd respectively.

At 406, the user identification of the receiving terminal, which is sent by the receiving terminal, is determined whether to be the same as the user identification of the receiving terminal that is allowed to receive data, which is uploaded by the sending terminal. If they are the same, operations at 408 are performed. Otherwise, operations at 410 are performed.

At 408, the data corresponding to the data identification is sent to the receiving terminal.

At 410, the data corresponding to the data identification is rejected to be sent to the receiving terminal.

Following the previous example, according to the user identification bbb of the receiving terminal, uploaded by the sending terminal A, which is allowed to receive the picture aaa, the server C matches it with the user identifications bbb, ccc, ddd that are respectively sent by the receiving terminal 1, the receiving terminal 2, and the receiving terminal 3. A matching result is that the user identification of the receiving terminal 1 is the same as the receiving terminal, uploaded by the sending terminal A, which is allowed to receive the picture aaa, both of which are bbb. Thus, the picture aaa is sent to the receiving terminal 1. With respect to the receiving terminal 2 and the receiving terminal 3, as the matching results are that the user identification of the receiving terminal sent by the receiving terminal 2 and the receiving terminal 3 respectively is not the same as the receiving terminal, uploaded by the sending terminal A, which is allowed to receive the picture aaa, the server C rejects to send the picture aaa to the receiving terminal 2 and the receiving terminal 3. When the server C rejects to send the picture aaa to the receiving terminal 2 and the receiving terminal 3, a notice including content such as "wrong user identification of user terminal, cannot download the picture aaa" may be sent to the receiving terminal 2 and the receiving terminal 3.

In addition to the above method that designates the user identification of the receiving terminal that is allowed to receive data to ensure the privacy of data transmission, according to another example, the data may be encrypted based on the designated user identification of the receiving terminal so that the designated receiving terminal may use the data to ensure the privacy of data transmission.

For example, when the sending terminal A only intends to send the picture to the receiving terminal 1, assuming that the user identification of the receiving terminal 1 is bbb, the sending terminal A firstly generates the data identification xyz corresponding to the picture aaa, uses the user identification bbb of the receiving terminal 1 to encrypt the picture aaa, and then sends the encrypted picture aaa and the data identification xyz corresponding to the picture aaa to the server C.

When the receiving terminal 1 receives the data identification xyz sent by the sending terminal through Bluetooth broadcast, the receiving terminal 1 may automatically send the data identification to the server C. After receiving the data identification xyz sent by the sending terminal A, the server C, according to the corresponding relationship between the data identification xyz and the picture aaa, searches for the encrypted picture aaa, and sends the found encrypted picture aaa to the receiving terminal 1. At the meantime, the server C may also send a prompt message to the receiving terminal 1 to remind the user of the receiving terminal 1 to encrypt the picture aaa by using the user identification of the receiving terminal so that the user of the receiving terminal 1 successfully decrypts the picture aaa. The other receiving terminals obtain the picture aaa from the server C after receiving the data identification xyz. As the user identifications of the other receiving terminals may not be used to decrypt the picture aaa, even though the other users obtain the picture aaa from the server C according to the data identification xyz, they cannot use the user identifications of the other receiving terminals to decrypt the picture aaa, thereby ensuring the privacy of data transmission.

In addition to encryption, some other methods such as limiting a number of times that the data is downloaded from the server or pre-determining an expiration time of the data stored in the server may be used to ensure the privacy of data transmission.

To clearly describe a data transmission relationship between a sending terminal, a receiving terminal, and a server, the following descriptions are described by reference to FIG. 5.

Figure 5:
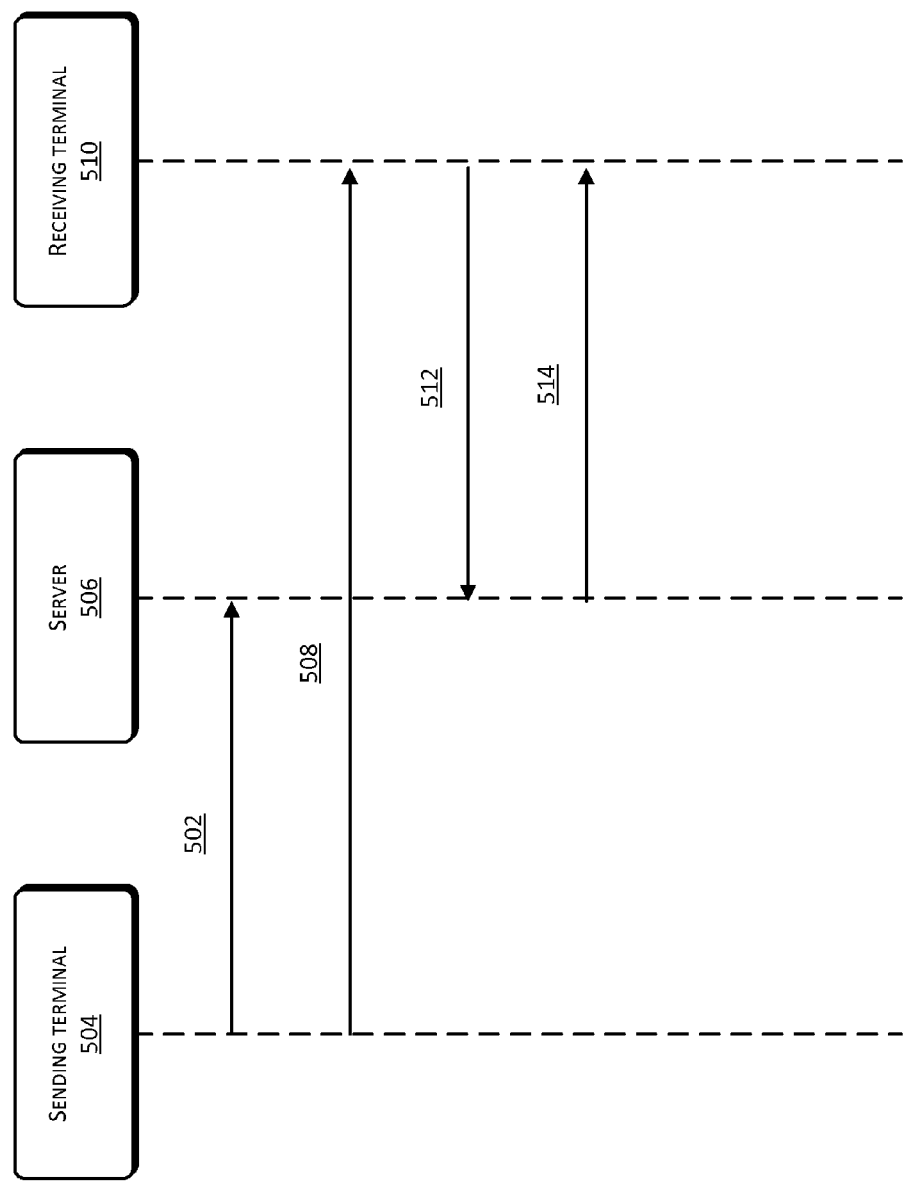
FIG. 5 is a flow chart illustrating an example data transmission method according to an example embodiment of the present disclosure.

FIG. 5 is a flow chart illustrating an example detailed data transmission method according to an example embodiment of the present disclosure.

At 502, a sending terminal 504 uploads data and a data identification corresponding to the data to a server 506.

At 508, the sending terminal 504 broadcasts the data identification to a receiving terminal 510 through a short distance wireless communication including a short distance wireless communication protocol.

At 512, the receiving terminal 510 sends the data identification to the server 506.

At 514, the server 506 sends the data corresponding to the data identifier to the receiving terminal 510.

The above is an example data transmission method according to the present disclosure. Based on the same techniques, the present disclosure also provides an example data transmission system and corresponding data transmission apparatus, as shown from FIG. 6 to FIG. 9.

Figure 6:
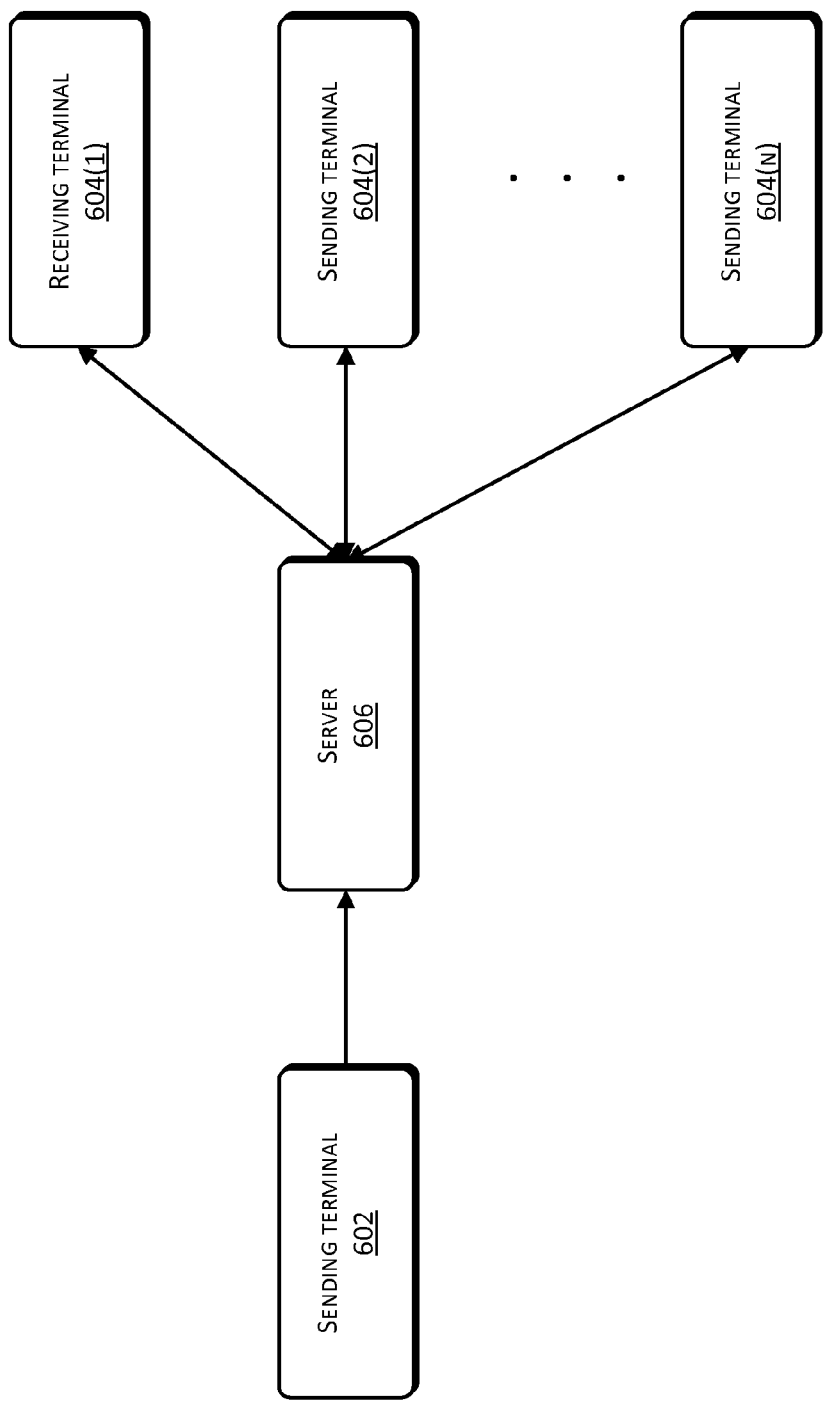
FIG. 6 is a diagram illustrating an example data transmission system according to an example embodiment of the present disclosure.

FIG. 6 is a diagram illustrating an example data transmission system according to an example embodiment of the present disclosure. The example system may include a sending terminal 602, one or more receiving terminals 604(1), 604(2), . . . 604(n) (n may be any integer), and a server 606.

The sending terminal 602 uploads data and a data identification corresponding to the data to the server 606 and broadcasts the data identification to the receiving terminals 604 through a short distance wireless communication including a short distance communication protocol.

A receiving terminal such as a respective receiving terminal 604(1) receives the data identification broadcasted by the sending terminal 602, sends the data identification to the server 606, and receives the data corresponding to the data identification returned by the server 606.

The server 606 receives the data and the corresponding data identification uploaded by the sending terminal 602, receives the data identification sent by the respective receiving terminal 604(1), and sends the data corresponding to the data identification to the respective receiving terminal 604(1).

For example, the short distance wireless communication may include Bluetooth.

For example, the sending terminal 602 may further obtain the user identification of the sending terminal 602 and upload the user identification of the sending terminal as the data to the server 606. The respective receiving terminal 604(1) may further obtain the user information corresponding to the user identification of the sending terminal 602 according to the user identification of the sending terminal 602 when the received data is the user identification of the sending terminal 602.

For example, the sending terminal 602 may further upload the data, the data identification corresponding to the data, and a user identification of a receiving terminal that is allowed to receive the data to the server 606. The respective receiving terminal 604(1) may further obtains the user identification of the respective receiving terminal 604(1) and send the data identification and the user identification of the respective receiving terminal 604(1) to the server 606. The server 606 may further receive the data, the data identification corresponding to the data, and the user identification of a receiving terminal that is allowed to receive the data from the sending terminal 602. The server 606 also receives the user identification of the respective receiving terminal 604(1). When the user identification of the respective receiving terminal 604(1) is the same as the user identification of a receiving terminal, uploaded by the sending terminal 602, which is allowed to receive the data, the server 606 sends the data corresponding to the data identification to the respective receiving terminal 604(1).

For example, a number of the receiving terminals is at least one.

Figure 7:
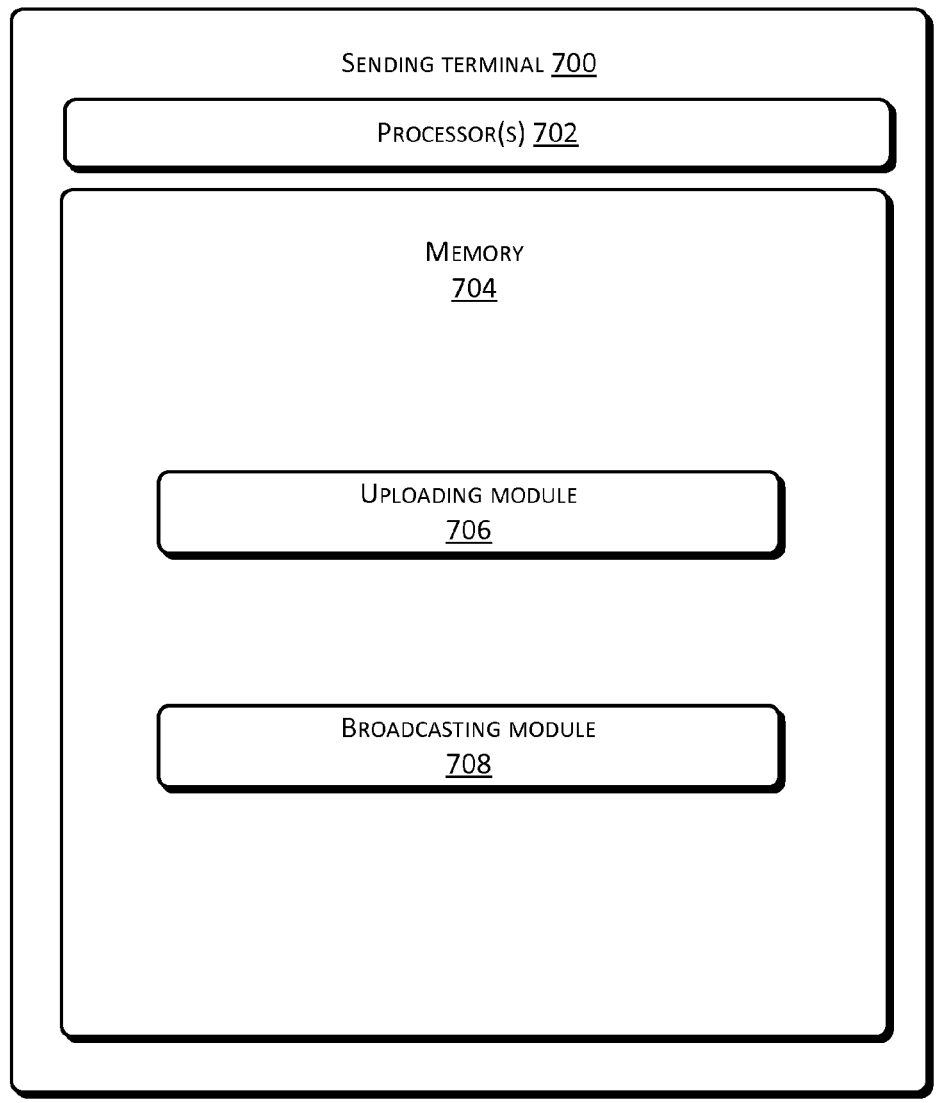
FIG. 7 is a diagram illustrating an example sending terminal for data transmission according to an example embodiment of the present disclosure.

FIG. 7 is a diagram illustrating an example sending terminal 700 for data transmission according to an example embodiment of the present disclosure.

The sending terminal 700 may include one or more processor(s) or data processing unit(s) 702 and memory 704.

The sending terminal 700 may further include one or more input/output interfaces and one or more network interfaces (not shown in FIG. 7).

The memory 704 is an example of computer-readable media. The memory 704 may store therein a plurality of modules or units including an uploading module 706 and a broadcasting module 708. The uploading module 706 transmits data and a data identification corresponding to the data to a server. The broadcasting module 708 broadcasts the data identification to one or more receiving terminals through a short distance wireless communication including a short distance communication protocol.

For example, the short distance wireless communication may include Bluetooth.

For example, the uploading module 706 may further obtain the user identification of the sending terminal and upload the user identification of the sending terminal as the data to the server.

For example, the uploading module 706 may further upload the data, the data identification corresponding to the data, a user identification of a receiving terminal that is allowed to receive the data to the server.

For example, a number of the receiving terminals is at least one.

Figure 8:
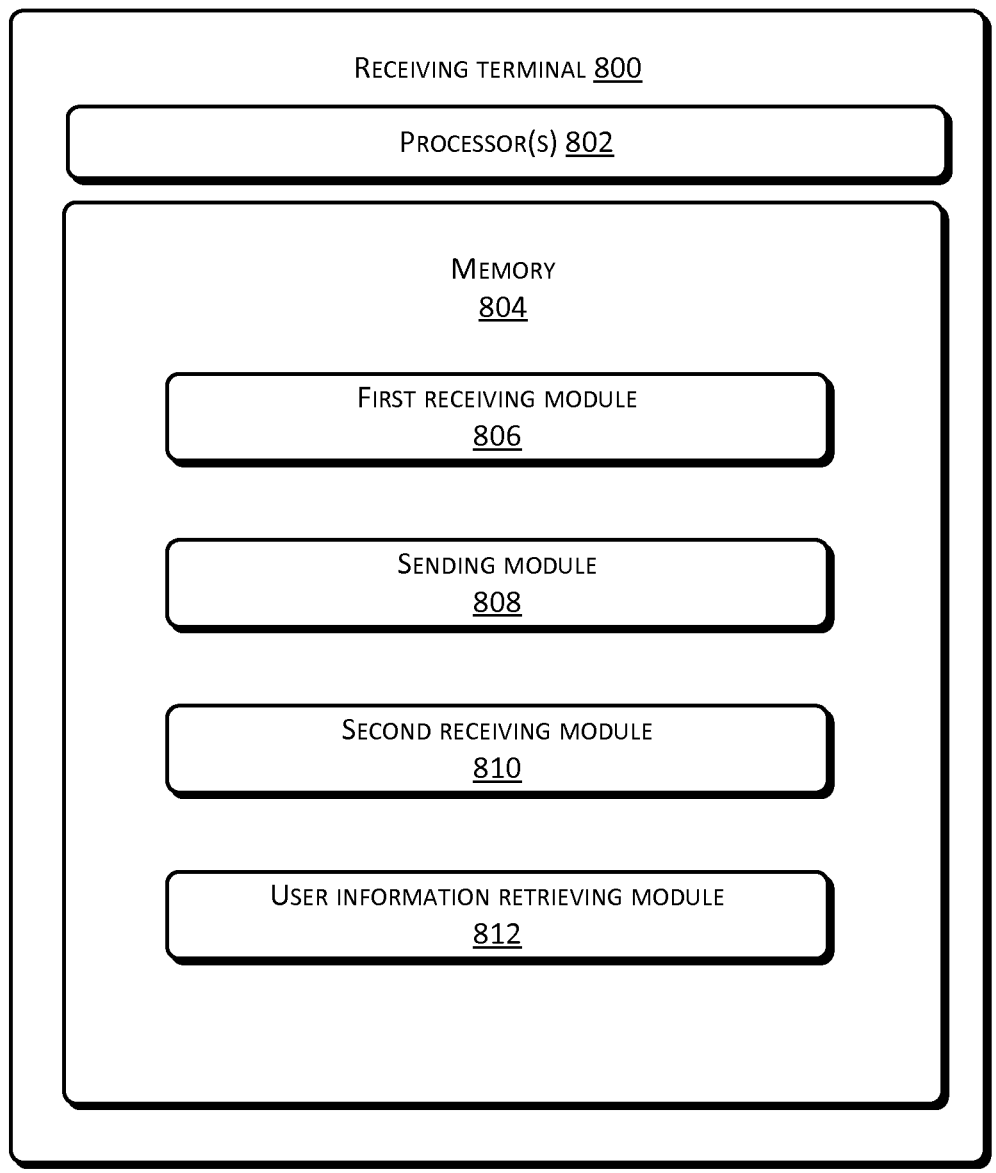
FIG. 8 is a diagram illustrating an example receiving terminal for data transmission according to an example embodiment of the present disclosure.

FIG. 8 is a diagram illustrating an example receiving terminal 800 for data transmission according to an example embodiment of the present disclosure.

The receiving terminal 800 may include one or more processor(s) or data processing unit(s) 802 and memory 804. The receiving terminal 800 may further include one or more input/output interfaces and one or more network interfaces (not shown in FIG. 8).

The memory 804 is an example of computer-readable media. The memory 804 may store therein a plurality of modules or units including a first receiving module 806, a sending module 808, and a second receiving module 810. The first receiving module 806 receives a data identification broadcasted by a sending terminal through a short distance wireless communication including a short distance communication protocol. The sending module 808 sends the data identification to the server. The second receiving module 810 receives data corresponding to the data identification returned by the server.

For example, the short distance wireless communication may include Bluetooth.

For example, the memory 804 may further store therein a user information retrieving module 812 that retrieves user information corresponding to the user identification of the sending terminal according to the user identification of the sending terminal when the received data is the user identification of the sending terminal.

For example, the user information retrieving module 812 may further obtain a user identification of the receiving module 800 and send the data identification and user identification of the receiving module to the server. The second receiving module 810 receives the data corresponding to the data identification returned by the server after the server authenticates the user identification of the receiving terminal.

Figure 9:
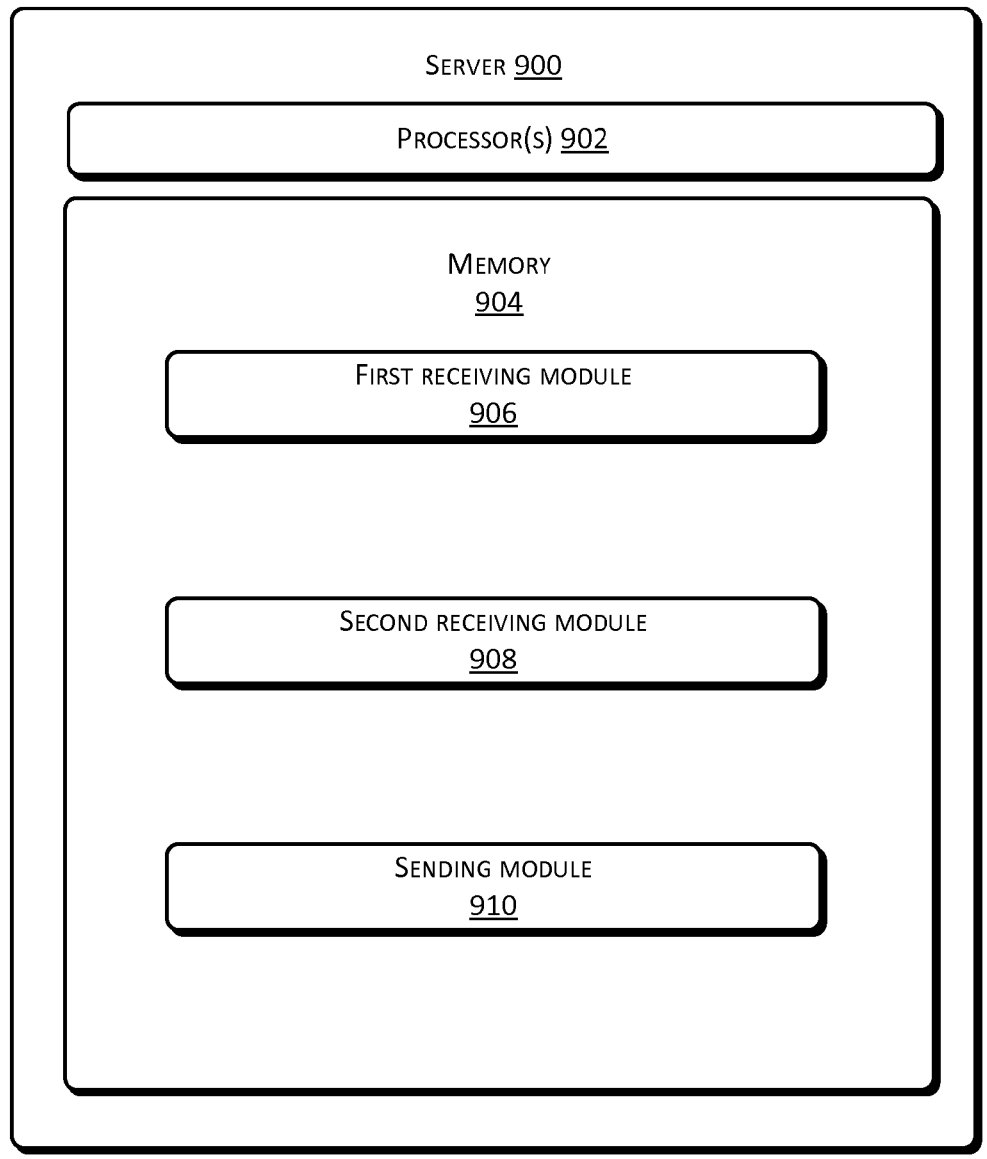
FIG. 9 is a diagram illustrating an example server for data transmission according to an example embodiment of the present disclosure.

FIG. 9 is a diagram illustrating an example server 900 for data transmission according to an example embodiment of the present disclosure.

The server 900 may include one or more processor(s) or data processing unit(s) 902 and memory 904. The server 900 may further include one or more input/output interfaces and one or more network interfaces (not shown in FIG. 9).

The memory 904 is an example of computer-readable media. The memory 904 may store therein a plurality of modules or units including a first receiving module 906, a second receiving module 908, and a sending module 910. The first receiving module 906 receives data and a data identification corresponding to the data uploaded by a sending terminal. The second receiving module 908 receives the data identification sent by a receiving terminal. The sending terminal broadcasts the data identification to one or more receiving terminals through a short distance wireless communication including a short distance communication protocol. The sending module 910 sends the data corresponding to the data identification to the receiving terminal.

For example, the first receiving module 906 may further receive a user identification of the sending terminal uploaded by the sending terminal.

For example, the first sending module 906 may further receive from the sending terminal the data, the data identification corresponding to the data, a user identification of a receiving terminal that is allowed to receive the data. The second receiving module 908 may further receive from the receiving terminal the data identification and the user identification of the receiving terminal. The sending module 910 may further send the data corresponding to the data identification to the receiving terminal when the user identification of the receiving terminal is the same as the user identification of the receiving terminal, uploaded by the sending terminal, which is allowed to receive the data.

For example, a number of the receiving terminals is at least one.

In a standard configuration, a computing device, such as the sending terminal, the receiving terminal, or the server, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the techniques of the present disclosure may be implemented by hardware, computer software, or a combination thereof. In addition, the techniques of the present disclosure may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the techniques of the present disclosure shall still fall under the scope of the claims of the present disclosure.

What is claimed is:

1. A method comprising:
   sending, by a sending terminal, data and a data identification corresponding to the data to a server; and
   broadcasting the data identification to one or more receiving terminals through a short distance wireless communication protocol, wherein the data identification is generated based on multiple parameters including at least a short distance communication method identification of the short distance wireless communication, a random number, and a time length from a previous particular time to a current time.

2. The method of claim 1, wherein sending the data and the data identification to the server enables a respective receiving terminal to obtain the data from the server according to the data identification.

3. The method of claim 1, wherein the short distance wireless communication protocol includes Bluetooth communication protocol, Infrared communication protocol, or Zigbee communication protocol.

4. The method of claim 1, further comprising sending user identification of the sending terminal to the server.

5. The method of claim 1, further comprising sending a user identification of a receiving terminal that is allowed to receive the data to the server.

6. The method of claim 1, wherein the data identification is broadcasted to one or more receiving terminals at a preset frequency within a preset time period.

7. A method comprising:
   receiving, by a receiving terminal, a data identification broadcasted by a sending terminal through a short distance wireless communication protocol;
   sending the data identification to a server; and
   receiving data returned from the server that corresponds to the data identification, wherein the data identification is generated based on multiple parameters including at least a short distance communication method identification of the short distance wireless communication, a random number, and a time length from a previous particular time to a current time.

8. The method of claim 7, wherein the short distance wireless communication protocol includes Bluetooth communication protocol, Infrared communication protocol, or Zigbee communication protocol.

9. The method of claim 7, further comprising:
   determining that the data is a user identification of the sending terminal; and
   obtaining user information corresponding to the user identification of the sending terminal according to the user identification of the sending terminal.

10. The method of claim 9, wherein obtaining the user information corresponding to the user identification of the sending terminal according to the user identification of the sending terminal comprises obtaining the user information corresponding to the user identification of the sending terminal from the server or a third party device according to the user identification of the sending terminal.

11. The method of claim 7, further comprising sending a user identification of the receiving terminal to the server.

12. The method of claim 11, wherein receiving the data returned from the server that corresponds to the data identification comprises receiving the data returned from the server that corresponds to the data identification after the user identification of the receiving terminal is determined to be a user identification of a receiving terminal that is allowed to receive the data.

13. A method comprising:
   receiving, by a server, data and a data identification corresponding to the data from a sending terminal;
   receiving the data identification from a particular receiving terminal; and
   sending the data to the receiving terminal, wherein the data identification is generated based on multiple parameters including at least a short distance communication method identification of the short distance wireless communication, a random number, and a time length from a previous particular time to a current time.

14. The method of claim 13, wherein the data identification is broadcasted by the sending terminal to the receiving terminal through the short distance wireless communication protocol.

15. The method of claim 13, wherein the short distance wireless communication protocol includes Bluetooth communication protocol, Infrared communication protocol, or Zigbee communication protocol.

16. The method of claim 13, further comprising receiving a user identification of the sending terminal from the sending terminal.

17. The method of claim 13, further comprising receiving respective one or more user identifications of one or more receiving terminals that are allowed to receive the data from the sending terminal.

18. The method of claim 17, further comprising receiving a user identification of the particular receiving terminal from the particular receiving terminal.

19. The method of claim 18, wherein sending the data to the particular receiving terminal comprises sending the data to the particular receiving terminal in response to determining that the user identification of the particular receiving terminal, is same as a user identification of the respective one or more user identifications.

20. The method of claim 13, wherein the data identification is generated further based on a unique device identification of the sending terminal.

* * * * *